United States Patent [19]

Debus et al.

[11] Patent Number: 4,605,131
[45] Date of Patent: Aug. 12, 1986

[54] UTILITY TABLE FOR ATTACHMENT TO A VERTICAL WALL, PARTICULARLY OF A SWITCH CABINET

[75] Inventors: Jurgen Debus, Dietzholztal; Claus-Dieter Ehrhardt, Springe, both of Fed. Rep. of Germany

[73] Assignee: Rittal-Werk Rudolf Loh GmbH & Co. KG, Fed. Rep. of Germany

[21] Appl. No.: 593,714

[22] Filed: Mar. 26, 1984

[30] Foreign Application Priority Data

Apr. 12, 1983 [DE] Fed. Rep. of Germany ....... 3313194

[51] Int. Cl.⁴ .............................................. A47F 5/08
[52] U.S. Cl. ..................................... 211/90; 108/134; 108/152; 211/150
[58] Field of Search .................... 211/90, 149, 150, 99, 211/104; 108/134, 135, 152, 160; 248/242, 447.1

[56] References Cited

U.S. PATENT DOCUMENTS

| 825,355 | 7/1906 | Selander | 108/134 X |
| 1,944,649 | 1/1934 | Smith | 211/150 X |
| 3,776,389 | 12/1973 | Waldecker | 211/90 |

FOREIGN PATENT DOCUMENTS

337311  4/1904  France .......................... 248/447.1

Primary Examiner—Robert W. Gibson, Jr.
Attorney, Agent, or Firm—Thomas W. Speckman

[57] ABSTRACT

A utility table for attachment to a vertical wall, particularly to a wall of a switch cabinet, with a tabletop platform and a support member joined to the wall such that it assumes an initial inoperative position folded parallel to the wall out of which the tabletop platform is moved into an inclined operative position. The support member moves into a supporting position due to its own weight whereby the tabletop platform is supported inclined to the wall so that it is prevented from returning to its initial inoperative position under load conditions.

21 Claims, 9 Drawing Figures

UTILITY TABLE FOR ATTACHMENT TO A VERTICAL WALL, PARTICULARLY OF A SWITCH CABINET

BACKGROUND OF THE INVENTION

This invention relates to a utility table for attachment to a vertical wall, particularly to a switch cabinet.

The availability of a utility or work surface to be used in connection with switch cabinets is more than a matter of convenience when installation, maintenance or repair work needs to be done and wiring and mounting diagrams, drawings and the like have to be kept close at hand for reference purposes.

SUMMARY OF THE INVENTION

It is an object of the present invention to provide a utility table of the foregoing type, which is constructed of simple component parts, is attachable to any vertical wall, and is adapted to be moved from a space saving initial position to an operative position.

This object is achieved according to the invention in that a tabletop in the form of a platform is provided on its underside at two opposite sides with bearing eyelets for receiving two short bearing pins or a single long bearing pin or shaft, that the bearing pin or pins are held in the eyelets parallel to the two opposite sides of the platform, that one side of the platform is tiltably attached to the wall by means of two short bearing pins or a single long bearing pin in combination with bearing elements for supporting the bearing pin(s), that the opposite side of the platform is joined to a support member capable of being pivoted a limited extent, the connection being established by two short bearing pins or a single long bearing pin and that the support member is adapted to be moved out of its initial position, in which it folds against the tabletop platform, into a supporting position in which it serves to hold the platform in a slanting work position.

The tabletop platform is tiltably secured to the wall and is joined to the support member which is pivotable to a limited extent. This is achieved with the assistance of two short bearing pins or a single long bearing pin. In its initial position, the support member is folded against the underside of the tabletop platform and the tabletop platform hangs parallel to the wall. Raising the platform by its lower edge causes the support member to move into a supporting position as a result of its own weight. The platform needs to be lifted some excess distance to create the necessary pivotal range for the support member. When the support member is in the supporting position, the platform is lowered again until the support member is braced against the wall and thus supports the platform in the desired work position.

When the support member is pivoted out of its supporting position and returned to its inoperative position by folding it against the platform, the platform may be returned to its initial position parallel to the wall.

According to one embodiment, the tabletop platform with its side walls is in the shape of a box with the open side facing the wall, and the side walls are reinforced by longitudinal and transverse supporting walls. The support member with its side walls is likewise in the shape of a box, with its open side facing away from the platform, and its side walls reinforced by longitudinal and transverse supporting walls.

The platform and the support member may be made of simple yet sturdy plastic parts made by injection molding techniques.

To achieve the desired pivotal mounting and storage of the support member, one embodiment provides that the tabletop platform is divided by two longitudinally directed supporting walls into three lengthwise sections, that the bearing eyelets for the short bearing pins or the single long bearing pin of the support member are formed on the longitudinal supporting walls, and that the side walls of the platform, which extend parallel to the longitudinal supporting walls, are provided with flush mounting holes. To pivotably mount the support member on the middle section of the platform, the support member is disposed between the two longitudinal supporting walls of the platform, and the transverse supporting walls disposed between the two longitudinal supporting walls are reduced at the top by the thickness of the box-shaped support member.

If two short bearing pins are used, they are mounted in two locations on the platform, and there is sufficient room for the support member inside the box-shaped tabletop platform. According to one embodiment, the mounting of the short bearing pins or of a single long bearing pin on the support member is such that the rectangular support member has bearing eyelets formed on the parallel side walls. The eyelets are aligned with each other, protrude a short distance from the exterior surface and extend along part of the width of the side walls of the support member. Thus, there is sufficient space between the support member and the adjacent longitudinal supporting walls of the platform to permit the support member to be pivoted without interfering with the supporting walls.

The operative supporting position of the support member is sustained in that the side wall of the hinged side of the support member is so inclined that, as the support member is moved into the operative position, it bears against the underside of the platform, and the opposite side wall of the support member projects upwardly from the upper surface of the support member to form a corresponding support panel.

In order to prevent the inadvertent release of the platform from its supported position under load conditions, the construction is such that in the supporting position the support member is perpendicular to the wall and its side wall forms a support panel that runs parallel to the wall.

To prevent the support member as it bears against the wall from damaging the wall, another embodiment provides that the side wall of the support member, which is used as a supporting panel, is provided with holes for mounting a resilient buffer plate.

According to another embodiment, mounting the tabletop platform at the smallest possible distance from the wall is achieved in that the bearing eyelets for the single long bearing pin or the short bearing pins for hinging the platform to the wall are formed immediately adjacent the facing side wall and extend from the side walls adjacent the hinge side over part of the width of the platform.

According to another embodiment, the side of the tabletop platform having the support member hinged thereon, has additional eyelets immediately adjacent the facing side wall, which eyelets extend from the side walls adjoining the hinged side up to the opposing longitudinal supporting wall.

According to another embodiment, such additional eyelets are advantageous when a plurality of platforms including support members are mounted on the wall in a side-by-side relationship by means of a single long bearing pin or individual short bearing pins and are stabilized and connected to each other at the hinged side of the support members by means of a long bearing pin inserted into eyelets of adjacent platforms. A further advantage resides in providing the adjoining side walls of adjacent platforms with holes for connecting screws.

To preclude or stifle any sounds that may occur as the platform is folded against the wall and to avoid damage to the wall, another embodiment provides that cylindrical sleeves are formed on the side walls in the region of the eyelets, the cylindrical bores of such sleeves being perpendicular to the platform plane and adapted to receive resilient buffer elements.

If the wall is made of a metal having magnetic conductivity, the tabletop platform may be retained in its initial position folded against the wall by a cup-shaped recess in the side wall of the tabletop platform where the support member is hinged having a cup-shaped permanent magnet therein.

To prevent any materials such as diagrams, drawings or the like which are placed on the tabletop platform when it is in the operative position from sliding off, according to another embodiment, the side of the tabletop platform having the support member hinged thereto, is provided on its upper surface with an upwardly projecting bar, the underside of which extends beyond the adjoining side wall to form a gripping bar. This gripping bar serves as a convenient handle for operating the tabletop platform.

According to another embodiment, the side of the platform which is hinged to the wall is provided on its upper surface with dividing bars or compartments extending parallel to the hinged side, for keeping pencils and other paraphernalia on the tabletop platform.

Tools or the like may be conveniently stored on the tabletop platform, according to another embodiment, in that the platform is provided in the region of the bars or compartments with recesses having different diameters, into which recesses screw drivers, wrenches, and the like may be placed.

BRIEF DESCRIPTION OF THE DRAWINGS

The invention will be further described with reference to embodiments illustrated in the drawing, in which.

DESCRIPTION OF THE PREFERRED EMBODIMENTS

Figure 1:
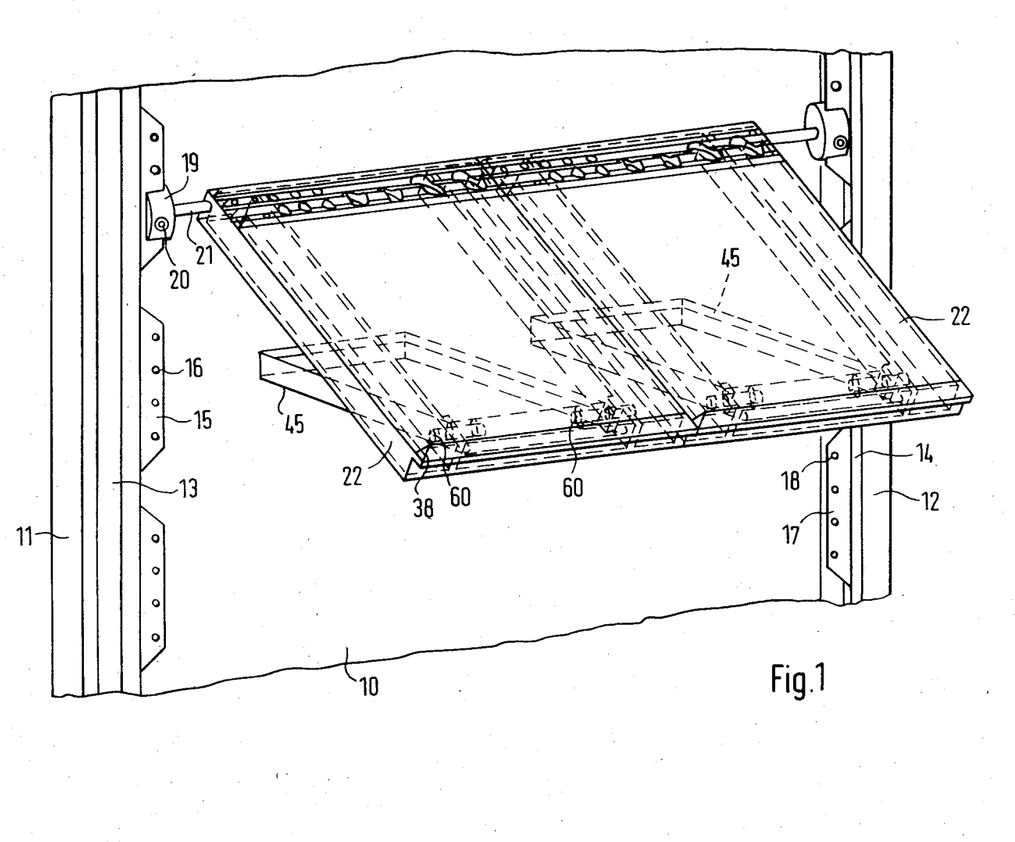
FIG. 1 is a perspective view showing a utility table mounted according to the invention on the inner side of the door of a switch cabinet.

In the embodiment illustrated in FIG. 1, two tabletop platforms 22 are placed side-by-side to form one continuous tabletop or work surface which is tiltably mounted on the inner side of the door of a switch cabinet. The door functions as a wall and is designated 10. Tabletop platform 22 is mounted on single long bearing pin 21 as disclosed presently. The ends of single long bearing pin 21 are held in bearing elements 19. In this particular type of mounting, single long bearing 21 may be either freely rotatable or it may be nonrotatable, depending on whether single long bearing pin 21 is secured to tabletop platform 22 non-rotatably or freely rotatably. Bearing elements 19 are fastened to mounting bars 15 and 17 by screws screwed into holes 16 and 18. Mounting bars 15 and 17 are components of Z-shaped reinforcement and mounting brackets 13 and 14 which are attached, preferably welded, to the inner side of cabinet door 10 within door edges 11 and 12.

As is also shown in FIG. 1, support member 45 is joined to tabletop platform 22 by means of two bearing pins 60 located on the underside of tabletop plate 22. Support members 45 are, in their initial or inoperative position, folded against the undersides of tabletop platforms 22, tabletop platforms 22 being parallel to wall 10. Raising the two tabletop platforms 22 by their lower edges causes support members 45 to move, as a result of their own weight, into the supporting position which is defined by their range of pivotability. When support members 45 are in their supporting position, tabletop platforms 22, which were lifted slightly in excess of the necessary height, are allowed to drop back down until support members 45 bear against wall 10. In the supporting position, support members 45 are braced perpendicularly against wall 10 to ensure that their support for tabletop platforms 22 will not be inadvertently released under load conditions.

When support members 45 are folded against tabletop platforms 22, the latter can be returned to their initial position, folded against wall 10.

In similar manner, a utility table comprising only one tabletop platform 22 may likewise be mounted and supported on wall 10. Instead of single long bearing pin 21, another embodiment uses two short bearing pins to achieve the tiltable mounting of tabletop platform 22.

Figure 6:
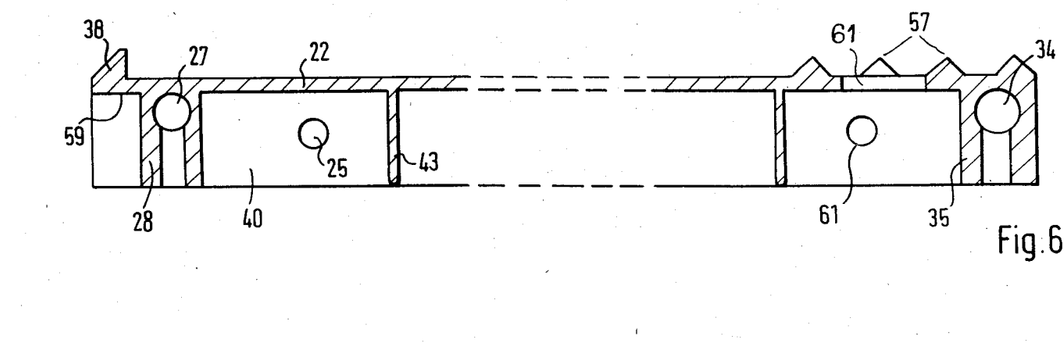
FIG. 6 is a sectional view of the table platform along line VI—VI of FIGS. 2 and 3.
Figure 7:
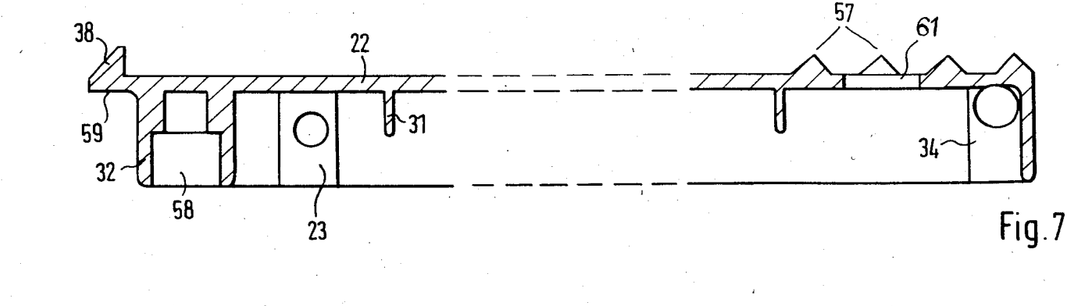
FIG. 7 is a sectional view of the table platform along line VII—VII of FIGS. 2 and 3.
Figure 8:
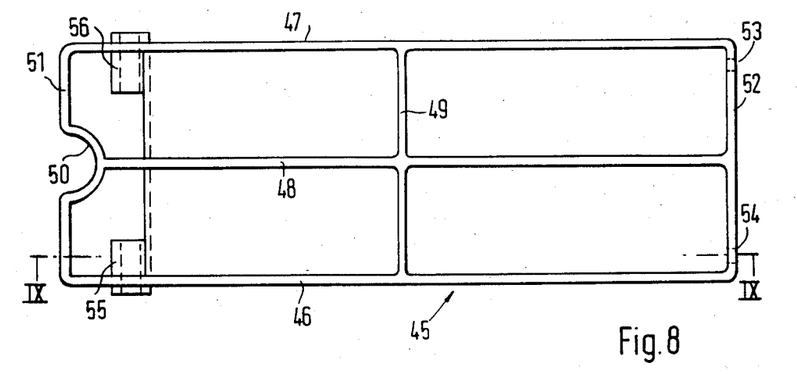
FIG. 8 is a view of the underside of the support member.
Figure 9:
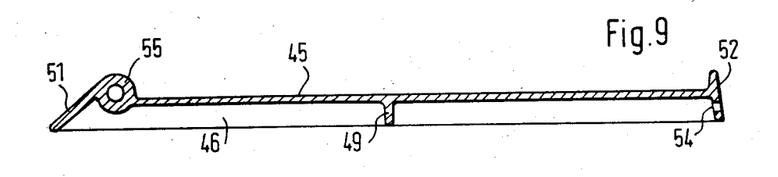
FIG. 9 is a sectional view of the support member along the line IX—IX of FIG. 8.

FIGS. 2 to 7 illustrate the structural details of an embodiment of tabletop platform 22. Tabletop platform 22 has the form of a box-shaped platform with side walls 39, 40, 41 and 44 which are reinforced by longitudinal support walls 42 and transverse supporting walls 31 and 43. Two longitudinal supporting walls 42 divide the underside of tabletop platform 22 enclosed by side walls 39, 40, 41, 44 into three lengthwise sections. At the side where support member 45 according to FIGS. 8 and 9 is hinged, longitudinal supporting walls 42 are provided with bearing bushings 23 and 24. Side walls 40 and 41 extending parallel to longitudinal supporting walls 42 are provided with flush bearing pin holes 25 and 26. Disposed between the two longitudinal supporting walls 42 is support member 45 having bearing bushings 55 and 56 in its side walls 46 and 47. Bearing bushings 55 and 56 project from the outer surfaces of side walls 46 and 47 to enable support member 45 to be freely pivotable between the longitudinal supporting walls 42 of tabletop platform 22. Transverse supporting walls 31 extending between longitudinal supporting walls 42 are reduced in their extending portions by an amount equal to the thickness of support member 45, so that support member 45 can be pivoted along its side wall into the lengthwise section of tabletop platform 22.

Pivotable mounting of support member 45 is achieved by means of two short bearing pins 60 which are inserted at one end through bearing pin hole 26 and bearing bushing 24 of tabletop platform 22 and into bearing bushing 55 of support member 45, and at the other end into bearing pin hole 25 and bearing bushing 23 of tabletop platform 22 and bearing bushing 56 of support member 45. Support member 45 is preferbly freely rotatable on bearing pins 60 which are non-rotatably mounted on tabletop platform 22. Instead of two short bearing pins 60, a single long bearing pin may be used which may extend along a series of adjacently positioned tabletop platforms 22.

Figure 2:
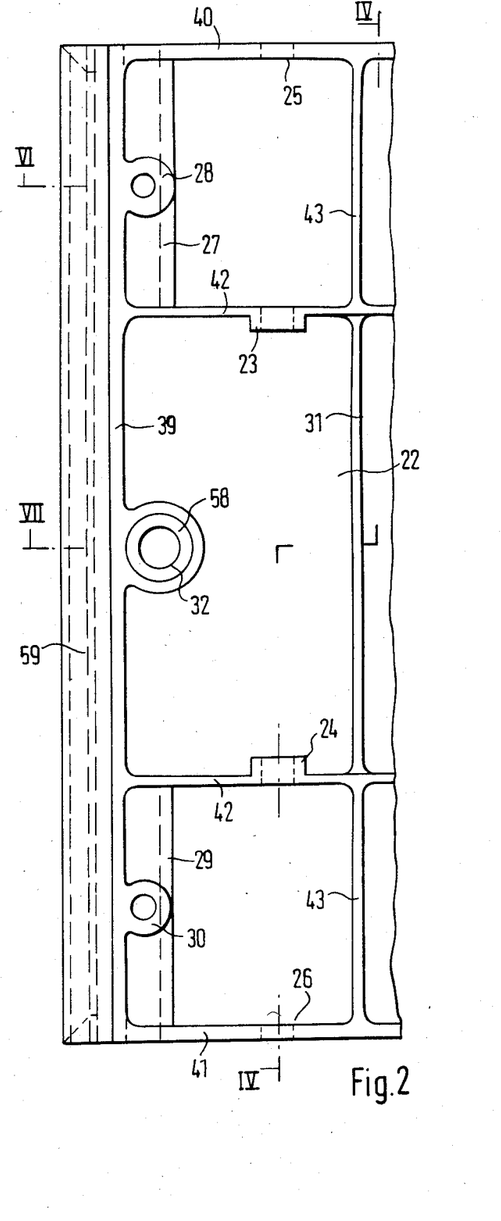
FIG. 2 is a partial view of the underside of the tabletop platform of FIG. 1, showing the side hinged for the support member.
Figure 4:
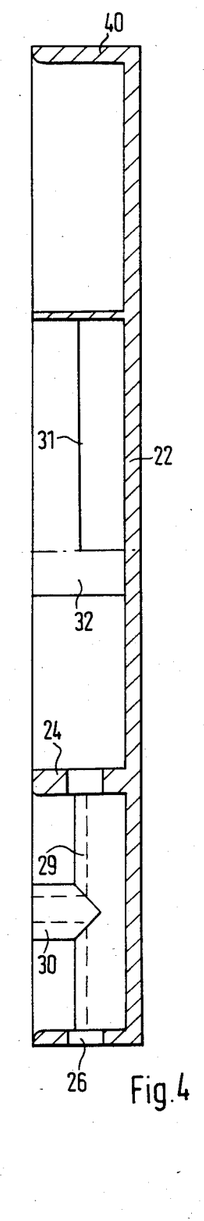
FIG. 4 is a sectional view of the table platform along line IV—IV of FIG. 2.
Figure 5:
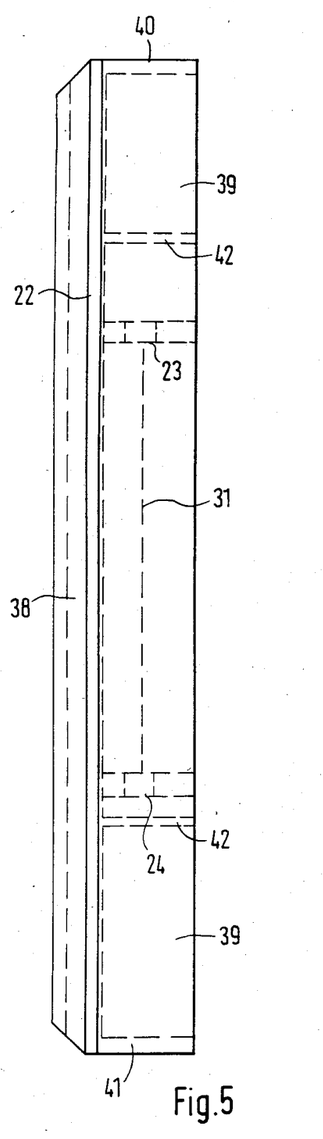
FIG. 5 is a side view of the table platform showing the side hinged for the support member.

Side walls 40 and 41, adjoining side wall 39 facing the hinged support member 45, have formed thereon additional pin holes 27 and 29 which extend up to longitudinal support walls 42. Additional pin holes 27 and 29 are intended to receive connecting pins or a continous bearing shaft for the purpose of joining together and stabilizing tabletop platforms 22. In addition, side wall 39 has depression 32 formed therein constituting receptacle 58 for a cup-shaped permanent magnet. The permanent magnet, which, when installed, functions to retain tabletop platform 22 folded against wall 10 when in its operative position. The upper surface of tabletop platform 22, in the region of side wall 39, has protruding bar 38 which extends above side wall 39 and forms a gripping bar or handle for convenient operation of tabletop platform 22.

Figure 3:
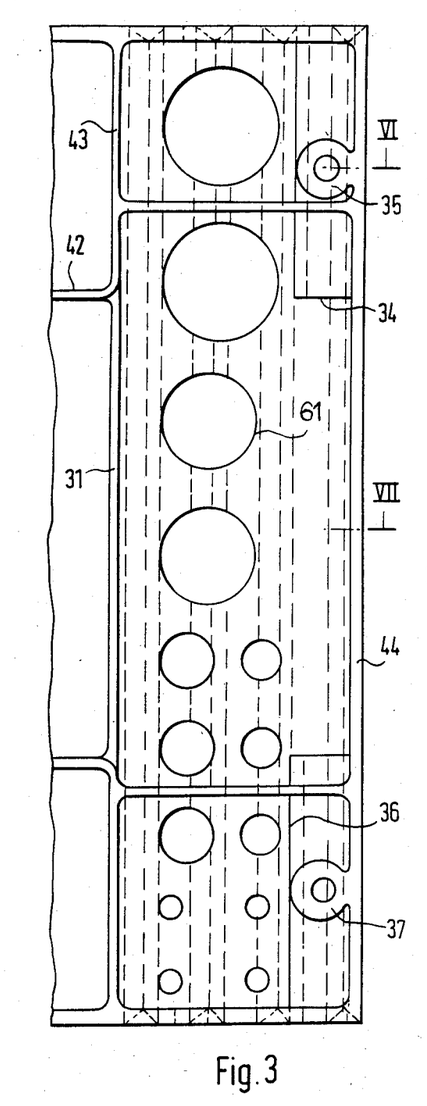
FIG. 3 is a partial view of the underside of the table platform of FIG. 1, showing the side hinged for mounting the tabletop platform to the wall.

The hinged side adjoining the side wall 44 has bearing bushings 34 and 36 formed thereon through which are keyed single long bearing shaft 21 or two bearing pins. Side walls 40 and 41 have bores 61 in this end region for connecting screws to firmly join adjacent tabletop platforms 22 together. The upper surface of tabletop platform 22 is provided in this end section with bars 57 extending parallel to the hinged side, which bars are spaced from each other to form file compartments. In addition, this area of tabletop platform 22 is provided with holes 61 of different diameters for holding tools or the like.

Support member 45 as shown in FIGS. 8 and 9 is provided in side wall 51 with recess 50 for cup-shaped recess 32 of tabletop platform 22. Side wall 51 of support member 45 is inclined and thus forms means to limit and stop the pivotal movement of support member 45 in its surrounding position when side wall 51 bears against the underside of tabletop platform 22. Support member 45 with its side walls 46, 47, 51 and 52 is also box-shaped and is reinforced by longitudinal supporting wall 48 and transverse supporting wall 49. Side wall 52 opposite the hinged side wall 51 of support member 45 is inclined so as to be parallel to wall 10 when in the supporting position. Side wall 52 protrudes above the upper surface of support member 45 to form a support panel. Side wall 52 has bores 53 and 54 for receiving a resilient buffer plate.

In the region of pin holes 27 and 29 and bearing bushings 34 and 36, side walls 39 and 44 of tabletop platform 22 have formed thereon cylindrical sleeves 28, 30, 35 and 37, which extend perpendicular to the plane of tabletop platform 22 and are adapted to receive resilient buffer elements to dampen any sound of platform 22 as it strikes wall 10 and to protect the wall from damage.

To compensate for possible tolerances between the fastening locations for bearing elements 19, one embodiment provides for setscrews (20) to be screwed into the cylindrical sleeves to permit the individual bearing pins joining the platform(s) to the wall to be axially and non-rotatably retained in the bearing bushings of the platform(s).

I claim:

1. Utility table for attachment to a vertical wall comprising a tabletop platform (22) having a tabletop surface with two longitudinal (40, 41) and two transverse (39, 44) side walls directed substantially perpendicular to said tabletop surface to form a box-shaped platform (22), said side walls reinforced by longitudinal supporting walls (42) and transverse supporting walls (31, 43); and a support member (45) having a support member surface with two longitudinal (46, 47) and two transverse (51, 52) side walls forming a box-shaped support member, said support member side walls reinforced by longitudinal (48) and transverse (49) supporting walls; said tabletop platform provided on its underside with aligned bearing bushings (34, 36) adjacent one said transverse side wall (44) supporting at least one bearing pin (21, 60) engageable in bearing elements (19) to tiltably attach said tabletop platform to said vertical wall, with the open side of said box-shaped platform facing said vertical wall, and aligned bearing bushings (23, 24) in said longitudinal supporting walls (42) supporting at least one bearing pin (21, 60) pivotably attaching said supporting member to said tabletop platform in the area of the other said transverse side wall (39), with the open side of said box-shaped support member facing said vertical wall, whereby said utility table is adjustable from an initial position wherein said tabletop platform is substantially parallel to said vertical wall and said supporting member is retained between said tabletop platform and said vertical wall to an inclined work position wherein said tabletop platform is inclined and said support member is perpendicular to said vertical wall, one said support member transverse side wall (52) projecting from said support member surface forming a support panel abutting said vertical wall, and the other said support member transverse side wall (51) projecting from said support member surface forming a support abutting said tabletop surface when said utility table is in said inclined work position.

2. Utility table according to claim 1, characterized in that said tabletop platform (22) is divided by said two longitudinal supporting walls (42) into three sections, and that said two longitudinal side walls (40, 41) of said tabletop platform (22) extending parallel to said longitudinal supporting walls (42) are provided with flush bearing eyelets (25, 26) aligned with said bearing bushings (23, 24).

3. Utility table according to claim 2, characterized in that said support member (45) is pivotably attached to said tabletop platform (22) between said two longitudinal supporting walls (42) of said tabletop platform (22), and that said transverse supporting walls (31) arranged between said longitudinal supporting walls (42) are reduced by the thickness of said support member (45).

4. Utility table according to claim 3, characterized in that said bearing bushings (34, 36) supporting said at least one bearing pin (21) for tiltably attaching said tabletop platform (22) to said wall (10) are formed immediately adjacent one said transverse side wall (44)

and extend inwardly from said longitudinally side walls (40, 41) for substantially less than the length of said transverse side wall (44).

5. Utility table according to claim 4, characterized in that the other said transverse side wall (39) of said tabletop platform (22) having said support member (45) pivotably attached thereto, is provided with bearing eyelets (27, 21) immediately adjacent said transverse side wall (39), said eyelets extending between said longitudinal side walls (40, 41) and said longitudinal supporting walls (42).

6. Utility table according to claim 5, characterized in that cylindrical sleeves (28 and 30, 35 and 37) are provided on said transverse side walls (39, 44), respectively, in the region of said bearing eyelets (27, 29) and said bearing bushings (34, 36), respectively, said cylindrical sleeves extending perpendicular to the plane of said tabletop platform (22) and retaining resilient buffer elements.

7. Utility table according to claim 6, characterized in that a cup-shaped recess (32) is provided on said transverse side wall (39) of said tabletop platform (22) pivotably attached to said support member (45), said recess (32) comprising a receptacle (58) retaining a cup-shaped permanent magnet.

8. Utility table according to claim 7, characterized in that said surface of said tabletop platform (22) near said transverse side wall (39) pivotably attached to said support member (45) is provided with an upwardly projecting retaining bar (38), the underside of which extends beyond said transverse side wall (39) to form a gripping bar (59).

9. Utility table according to claim 8, characterized in that said surface of said tabletop platform (22) near said transverse side wall (44) is provided with a plurality of dividing bars (57) forming compartments extending parallel to said transverse side wall (44).

10. Utility table according to claim 9, characterized in that a plurality of holes (61) having different diameters are provided in the region of said dividing bars (57) and said compartments.

11. Utility table according to claim 10, characterized in that said support member (45) has bearing bushings (55, 56) extending through said longitudinal side walls (46, 47), said bearing bushings protruding a short distance from the exterior surface of said longitudinal side walls (46, 47) and extending substantially less than the length of said transverse side wall (51) of said support member (45).

12. Utility table according to claim 11, characterized in that said transverse side wall (52) of said support member (45) serves as a support panel and is provided with bores (53, 54) for mounting a resilient buffer plate.

13. Utility table according to claim 12, characterized in that a plurality of said table top platforms (22) with said support members (45) pivotably attached thereto are joined to said vertical wall (10) by means of at least one bearing pin (21).

14. Utility table according to claim 13, characterized in that said longitudinal side walls (40, 41) of adjacent tabletop platforms (22) are provided with aligned bores (61) for connecting bolts.

15. Utility table according to claim 13, characterized in that said adjacent tabletop platforms (22) are connected to each other and stabilized in the area of transverse side wall (39) by means of a single bearing pin (21) inserted into said bearing eyelets (27, 29).

16. Utility table according to claim 1, characterized in that said bearing bushings (34, 36) supporting said at least one bearing pin (21) for tiltably attaching said tabletop platform (22) to said wall (10) are formed immediately adjacent one said transverse side wall (44) and extend inwardly from said longitudinal side walls (40, 41) for substantially less than the length of said transverse side wall (44).

17. Utility table according to claim 1, characterized in that said transverse side wall (39) of said tabletop platform (22) having said support member (45) pivotably attached thereto, is provided with bearing eyelets (27, 29) immediately adjacent said transverse side wall (39), said eyelets extending between said longitudinal side walls (40, 41) and said longitudinal supporting walls (42).

18. Utility table according to claim 1, characterized in that said support member (45) has bearing bushings (55, 56) extending through said longitudinal side walls (46, 47), said bearing bushings protruding a short distance from the exterior surface of said longitudinal side walls (46, 47) and extending substantially less than the length of said transverse side wall (51) of said support member (45).

19. Utility table according to claim 1, characterized in that a plurality of said table top platforms (22) comprising said support members (45) are joined to said wall (10) by means of at least one said bearing pin (21).

20. Utility table attached to a vertical wall (10) formed by the inner side of a switch cabinet door provided on its longitudinal edges with reinforcement and mounting brackets (13) terminating in mounting bars (15) having bores therein, said utility table comprising a tabletop platform (22) having a tabletop surface with two longitudinal (40, 41) and two transverse (39, 44) side walls directed substantially perpendicular to said tabletop surface to form a box-shaped platform (22), said side walls reinforced by longitudinal supporting walls (42) and transverse supporting walls (31, 43); and a support member (45) having a support member surface with two longitudinal (46, 47) and two transverse (51, 52) side walls forming a box-shaped support member, said supporting member side walls reinforced by longitudinal (48) and transverse (49) supporting walls; said tabletop platform provided on its underside with aligned bearing bushings (34, 36) adjacent one said transverse side wall (44) supporting at least one bearing pin (21,60) engaging in bearing elements (19) mounted in said bores in said mounting bars (15) to tiltably attach said tabletop platform to said vertical wall, with the open side of said box-shaped platform facing said vertical wall, and aligned bearing bushings (23, 24) in said longitudinal supporting walls (42) supporting at least one bearing pin (21, 60) pivotably attaching said supporting member to said tabletop platform in the area of the other said transverse side wall (39), with the open side of said box-shaped support member facing said vertical wall, whereby said utility table is adjustable from an initial position wherein said tabletop platform is substantially parallel to said vertical wall and said supporting member is retained between said tabletop platform and said vertical wall to an inclined work position wherein said tabletop platform is inclined and said support member is perpendicular to said vertical wall, one said support member transverse side wall (52) projecting from said support member surface forming a support panel abutting said vertical wall, and the other said support member transverse side wall (51) projecting from said support member surface forming a support for abutting said tabletop surface when said utility table is in said inclined work position.

21. Utility table attached to a vertical wall according to claim 20, characterized in that setscrews are screwed into cylindrical sleeves provided in said bearing elements (19) whereby said bearing pins for tiltably attaching said tabletop platform (22) to said wall (10) are axially and non-rotatably secured in said bearing elements (19).

* * * * *